United States Patent [19]

Sakagami et al.

[11] 4,294,677
[45] Oct. 13, 1981

[54] METHOD FOR ELECTRODEPOSITING A PROTEIN ONTO AN ION-EXCHANGE MEMBRANE

[75] Inventors: Teruo Sakagami, Iwaki; Tadaaki Kato, Tokyo; Toru Hirai; Naohiro Murayama, both of Iwaki, all of Japan

[73] Assignee: Kureha Kagaku Kogyo Kabushiki Kaisha, Tokyo, Japan

[21] Appl. No.: 74,826

[22] Filed: Sep. 12, 1979

[30] Foreign Application Priority Data

Nov. 17, 1978 [JP] Japan ................................ 53-141863

[51] Int. Cl.³ .......................... C25D 1/18; C25D 1/20
[52] U.S. Cl. ......................... 204/181 F; 204/299 EC; 204/300 EC
[58] Field of Search ........... 204/181 F, 181 C, 181 R, 204/299 EC, 300 EC

[56] References Cited

U.S. PATENT DOCUMENTS

| 3,449,230 | 6/1969 | Heron et al. | 204/181 R |
| 3,556,969 | 1/1971 | Mizuguchi et al. | 204/181 F |
| 3,758,396 | 9/1973 | Vieth et al. | 204/181 F |
| 4,180,451 | 12/1979 | McRae | 204/180 P |

FOREIGN PATENT DOCUMENTS

| 448230 | 1/1913 | France | 204/180 R |
| 510931 | 12/1920 | France | 204/180 P |
| 574552 | 7/1924 | France | 204/182 |
| 31703 | 3/1861 | France | 204/182 |
| 2270267 | 12/1975 | France | 204/180 P |
| 511088 | 8/1939 | United Kingdom | 204/181 F |

*Primary Examiner*—Howard S. Williams
*Attorney, Agent, or Firm*—Wegner & Bretschneider

[57] ABSTRACT

A method for electrodepositing a protein by electrophoresis onto an ion-exchange membrane from a liquid in which the protein is dissolved or is dispersed in suspension, and an apparatus for the electrodepositing are disclosed.

11 Claims, 3 Drawing Figures

METHOD FOR ELECTRODEPOSITING A PROTEIN ONTO AN ION-EXCHANGE MEMBRANE

BACKGROUND OF THE INVENTION

The present invention relates to a method for electrodepositing a protein onto an ion-exchange membrance by electrophoresis from a solution in which the protein has been dissolved or dispersed in suspension and an apparatus for the electrodepositing thereof.

The technique of depositing an electrically charged high molecular substance by electrophoresis on an electrode has been well known and hitherto been widely applied in industrial fields including the field of painting.

The advantage of this method of depositing resides in that the high molecular substance can be electrodeposited in a relatively uniform thickness on the electrodes of any shape, and that thermal steps such as evaporation are not necessary for separating the charged substance and the liquid in which the charged substance had been included.

On the other hand, however, since the electrically charged substance is directly deposited on the electrodes in the above-mentioned well known method, there are drawbacks such as the simultaneous occurrence of reactions between the charged high molecular substance and the electrodes, those between the high molecular substance and various gases generated by the simultaneously occurring electrolysis of water. Especially, in cases where the above-mentioned well known method is applied on the separation of bio-high molecular substances, since such substances are apt to be subjected to the effects of oxidation, reduction, etc., unfavorable phenomena of chemical changes such as degeneration, deterioration, etc. are frequently observed.

Moreover, in the case where the above-mentioned well known method is applied to the electrodepositing of bio-high molecular substances such as proteins, the following drawbacks are frequently noticed:

(1) In the case where a high molecular substance is electrically deposited on the surface of an electrode, gases such as oxygen and hydrogen are generated usually due to electrolysis of water on the surface of the electrode and these gases persist within the film of the electrodeposited high molecular substance on the surface of the electrode and as a result, it is frequently impossible to obtain a foamless film of the substance, (2) It is necessary to give an appropriate electric charge to the high molecular substance in order to move the substance toward the surface of the electrode by electrophoresis, and as a condition for such a step, the pH of the high molecular substance is especially important.

However, there are many cases where such a condition is not necessarily most appropriate for electrically depositing the high molecular substance to the surface of the electrodes. In other words, the overvoltage of the electrode usually fluctuates widely due to the conditions by which an appropriate charge is given to the high molecular substance such as pH, and for that reason, there are many cases where a high operational voltage is necessary or, in certain circumstances, the electrode is affected, (3) Even in cases where the conditions of electrophoresis of the high molecular substance to the surface of the electrode are fulfilled, since on the electrodepositing of the high molecular substance, for instance, a water-soluble protein, the protein is deposited on the surface of the electrode in a state of still containing water absorbed by the protein, it is frequently impossible to obtain an electrodeposited layer of protein in a high density accompanied by an appropriate dehydration. This phenomenon is due to the facts that the conditions for electrophoresis and the conditions for dehydration of the protein are different, and especially, that the dependencies of both conditions on pH is different from each other. In addition, in the process of usual methods of the electrodepositing, it is extremely difficult to adjust both the two conditions, and (4) According to the construction of the electrode used for electrodepositing, there are cases where the charged high molecular substance, for instance, a protein, and the surface of the electrode get tangled together in the progress of the formation of the electrodeposited layer of the high molecular substance, or the layer comes to hold the gases generated. As a result, the operating voltage is raised drastically as time passes not only to reduce the recovery of the protein but also to make the removal of the protein layer from the electrode difficult and to impair the quality of the deposited film layer of protein remarkably.

Accordingly, the object of the present invention is to offer a method of effectively producing a homogeneous film of protein not containing any bubbles by a process of electrodepositing in the utilization of electrophoresis from a liquid in which the protein is dissolved or dispersed in suspension.

Another object of the present invention is to offer a method according to the above-mentioned process of electrodepositing for effectively recovering the protein.

Still another object of the present invention is to offer an apparatus for carrying out the above-mentioned methods.

The inventors have found that in the case where a protein is electrically deposited, utilizing electrophoresis, from a liquid in which the protein is dissolved or dispersed in suspension, the above-mentioned object is satisfied by interposing an ion-exchange membrane between the above-mentioned liquid and the electrode and by causing the protein not to be deposited onto the surface of the electrode but onto the ion-exchange membrane.

The following is the explanation of the present invention in detail:

DETAILED DESCRIPTION OF THE INVENTION

Figure 1:
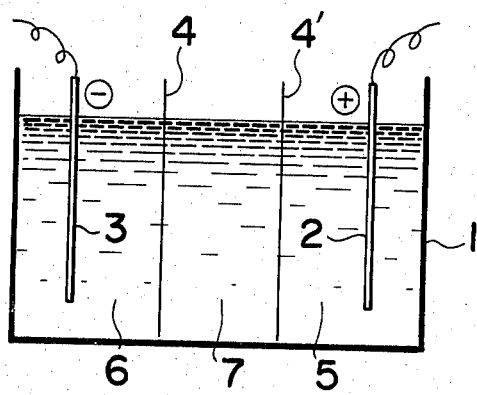
FIG. 1 of the annexed drawings is an explanatory figure showing one instance of the apparatus for executing the electrodepositing method according to the present invention schematically.

The leading characteristic of the present invention resides in that at least one ion-exchange membrane is interposed between the electrode and the liquid containing a protein to be electrodeposited.

That is, in the case where the protein to be electrodeposited has a positive electric charge and it is wished to move the charged protein toward the cathode, the ion-exchange membrane is interposed between the cathode and the liquid containing the charged protein and the protein is moved by electrophoresis toward the cathode to be electrodeposited onto the surface of the ion-exchange membrane. On the other hand, in the case where the protein is negatively charged and it is wished to move the charged protein toward the anode, the ion-exchange membrane is conversely interposed between the anode and the liquid containing the above-mentioned negatively charged protein. Accordingly, in either case, the electrode which is antipode to the electrode toward which the protein moves contacts with the liquid containing the protein.

In the next place, in the case where two ion-exchange membranes are used, the liquid containing the protein is placed between these two membranes, and since in this case the spaces between the ion-exchange membranes and the electrodes, that is, the anode chamber and the cathode chamber, should be in an electroconductible state, an electrolytic solution such as an aqueous solution of an inorganic acid or an alkaline substance is placed therein.

The present invention has an advantage in that the electrophoretic conditions of the protein and the conditions of dehydration of the electrodeposited protein can be controlled by changing the concentration of the inorganic acid or the alkaline substance in each chamber in relation to the pH values in the surface of the electrodes and of the solution containing the protein.

For instance, in the case where the positively charged protein dispersed in water is to be electrically deposited on the ion-exchange membrane on the cathode side, the cathode and the aqueous acidic dispersion of the protein are divided by an anion-exchange membrane and the cathode chamber is filled with an aqueous alkaline solution. In this case, the positively charged protein moves by electrophoresis toward the cathodic side and adheres to the anion-exchange membrane. However, $OH^-$ ions in the aqueous alkaline solution in the cathode chamber are able relatively easily to pass through within the anion-exchange membrane to neutralize the positively charged protein at the surface of the membrane. In this case, it becomes possible to adjust the optimum conditions relatively easily by controlling the concentration of the charged protein, pH of the aqueous dispersion of the charged protein and of the aqueous alkaline solution, the current intensity, the exchange capacity of the ion-exchange membrane, etc.

In the above-mentioned cases, however, especially where the pH of the aqueous dispersion of the protein is relatively near to neutrality and the diffusion of a large amount of $OH^-$ ions lowers the concentration of the alkaline substance in the cathode chamber, it is preferable to utilize the cation-exchange membrane. The extreme reduction of the concentration of alkaline substance in the cathode side requires a higher voltage in electrodepositing and on the other hand, the movement of $OH^-$ ion is relatively easy at a relatively higher concentration of alkaline substance even through the cation-exchange membrane.

Further, in the above-mentioned instance, the following advantage is observed by the use of two ion-exchange membranes: that is, the interposing of one more cation-exchange membrane between the anode and the aqueous dispersion of the protein and the filling with an aqueous hydrochloric acid solution of the space between the newly interposed membrane and the anode chamber make it possible to prevent the raising of pH of the aqueous dispersion of the protein by the presence of the cation-exchange membrane and to maintain the pH continuously constant.

Although the material of the ion-exchange membrane used in the present invention is not especially restricted, the membrane may comprise chemically resistant highly-bridged polymeric skeletons on which many anion- and cation-exchange groups such as sulfonate group, carboxylate group, phenol group, ammonium group, etc. are attached as substituents. For instance, possible membrane material includes bridged poly (acrylic acid) resin, bridged poly(methacrylic acid) resin (for instance, divinylbenzene, trivinylbenzene, etc. are used as the bridging agent in these resin), sulfonated copolymer of styrene and divinylbenzene, quarternized homopolymer and copolymer of vinylpyridine, etc.

In addition, the membrane comprising especially chemical-resistant fluoropolymer resins is advantageously usable from the following view point: Usually, the membrane comprising the fluoropolymer resin is very easily detachable from the layer of the hydrophilic high molecular substance such as proteins and strong cohesion of the protein to the fluoropolymer seldom occurs as well as the intermingling of them.

As the material of ion-exchange membrane comprising fluoropolymer resins, those having sulfonate group(s), carboxylate group(s), phenol group(s), etc. introduced into homopolymer(s) or copolymer(s) of tetrafluoroethylene, chlorotrifluoroethylene, trifluoroethylene, hexafluoropropyrene, vinylidene fluoride, $\alpha$, $\beta$, $\beta$-trifluorostyrene, etc. are known. Among the ion-exchange membranes comprising these fluoropolymer resins, a membrane comprising a copolymer of perfluorovinyl ether and tetrafluoroethylene, which has pendant-type sulfonate groups (Nafion, registered trade mark, a product of E.I. Du Pont de Nemours & Co. Inc.) is one of the preferable membranes.

In the next place, as the electrode used in the present invention, all of the electrodes usually used for electrochemical reactions are utilizable. As the material for the cathode, for instance, iron, stainless steel, platinum, etc. are suitable, and as the material for anode, titanium, carbon, platinum, DSA (titanium coated with ruthenium oxide), etc. are suitable.

These electrodes and the ion-exchange membranes are used after fabricating to suitable shapes for the purpose for use. For instance, in the case where a plate form of protein film is to be produced, the plate type of electrodes and ion-exchange membranes is suitable. For the purpose of continuously producing a cylindrical protein film, the electrodes and the ion-exchange membranes should be cylindrical in shape. In addition, for the purpose of continuously producing a flat-type of film, it is preferable to use an ion-exchange membrane having a shape of a rotatory drum.

The kinds of electrically deposited protein according to the present invention is not restricted. That is, not only the simple proteins which liberate only amino acids on hydrolysis but also complex proteins such as glycoproteins and lipoproteins containing other organic compounds can be electrically deposited by the present invention. Moreover, these proteins can be applied not only as their aqueous solution but also as the form of an aqueous dispersion in suspension.

Accordingly, the proteins electrically depositable according to the present invention include, for instance, simple proteins such as ovoalbumin, lactalbumin, serumalbumin, leucosin, legumelin, ovoglobulin, serumglobulin, lactoglobulin, glutenin, prolamine, collagen, elastin, keratin, fibroin, histone, and protamine, phosphoproteins such as casein, vitellin and phosvitin, chromoproteins such as ferritin, haemocyanin, haemoglobin and myoglobin, glycoproteins such as glucoprotein and mucoprotein, nucleoproteins, lipoproteins, etc. It is especially interesting to note that a complex product formed by the antigen-antibody reaction in blood can be electrodeposited by the method of the present invention. That is, the above-mentioned complex product formed in blood in vivo can be electrodeposited according to the present invention and then removed from the blood, and so, medical applications of the present invention are expectable.

In addition, any mixtures of the above-mentioned proteins can be electrodeposited according to the present invention.

Since the above-mentioned proteins have in their molecules both the acidically dissociable groups and the basically dissociable groups, they are present in their solution as zwitter-ions. That is, since the protein bears negative electric charges in the pH range more alkaline than its isoelectric point and bears positive charges in the pH range more acidic than its isoelectric point, the pH of the aqueous dispersion of the protein may be adjusted according to the kinds of protein to be deposited or according to the choice of the electrode. Generally, the approximate range of pH adopted in the present invention is from 2.0 to 10.0. The charged protein molecules either positively or negatively having a certain value of pH move toward either the cathode or the anode in electrophoresis on the application of a direct current and arrive at the surface of ion-exchange membrane adopted in the present invention.

Generally, the amount of water absorbed by a protein fluctuates widely according to pH, and accordingly, at the time point when the protein molecule arriving at the surface of the ion-exchange membrane deposits on the membrane, it is preferable that the amount of water which has been absorbed by the protein is as small as possible, that is, the pH of the protein molecule is in a range in which the protein is dehydrated. Especially in the case where an especially homogeneous film of protein is to be produced, it is necessary to maintain the pH of the surface of the ion-exchange membrane in the above-mentioned range. For that purpose, it is necessary to adjust the pH of the surface of the ion-exchange membrane according to the pH of the aqueous dispersion of the protein.

For instance, in the case where a protein charged positively is deposited onto the surface of an ion-exchange membrane placed in the cathode side, the degree of dehydration of the deposited protein is raised by moving the pH of the surface of the ion-exchange membrane to the alkaline side. That is, in order to raise the degree of dehydration it is necessary to raise the pH of the surface of the ion-exchange membrane higher than the pH of the aqueous dispersion of the protein, and for that purpose the cathode chamber is filled with an aqueous alkaline solution. An aqueous 0.1 to 5 N sodium hydroxide solution is frequently used for that purpose.

Inversely, in the case where a protein charged negatively is deposited onto the suface of an ion-exchange membrane placed in the anode side, the degree of dehydration of the resultant film of protein can be raised by filling the anode chamber with an aqueous acidic solution.

Furthermore, in the present invention, it is also possible to deposit a water-insolubilized protein obtained by salting out a protein which has been dissolved in water, or such a protein obtained by adjusting the pH of the aqueous space between an ion-exchange membrane and an electrode, in an aqueous dispersion. This process is used when a water-insoluble film of protein is required starting from a water-soluble protein.

The following is the explanation of the apparatus in which the method of the present invention is executed with reference to the annexed DRAWINGS.

FIG. 1 of DRAWINGS exemplifies an electrodepositing cell provided with two ion-exchange films, and in FIG. 1, 1, 2, 3, 4 and 4', 5, 6 and 7 show, respectively, the cell, the anode, the cathode, cation-exchange membranes, respectively, the anode chamber formed by the cation-exchange membrane 4' as the diaphragm, the cathodes chamber formed by another cation-exchange membrane 4 as the diaphragm, and the aqueous space formed by the above-mentioned two cation-exchange membranes 4 and 4'. In addition, in the anode chamber 5, an aqueous inorganic acid solution, for instance, an aqueous 0.1 N hydrochloric acid is placed, and in the cathode chamber 6, an aqueous alkaline solution, for instance, an aqueous 0.2 N sodium hydroxide solution is placed.

The amount of the aqueous electrolyte solutions, respectively in the anode chamber 5 and the cathode chamber 6 is adjusted respectively according to the amount of the aqueous dispersion of protein in the space 7.

In the operation of the above-mentioned electrodepositing cell, at first, an aqueous dispersion of a protein to be deposited is introduced into the space 7, and an aqueous inorganic acid solution and an aqueous alkaline solution are respectively introduced into the anode chamber 5 and the cathode chamber 6, and then a direct current is applied under a fixed stationary voltage.

In the above-mentioned case where the pH of the aqueous dispersion of the protein is adjusted to, for instance, 3.5 and by this procedure, the aqueous dispersion is positively charged, the protein molecules move by electrophoresis toward the cathode and electrically deposit on the surface of the cation-exchange membrane 4 which is a diaphragm forming the cathode chamber 6.

In addition, it is also possible to provide a magnetic stirrer at the bottom of the above-mentioned space 7 in the cell 1 and to introduce the aqueous dispersion of a protein from an inlet provided at an upper end of one of the sides of the space 7 continuously at a fixed rate and to deposit the protein onto the cation-exchange membrane 4 under agitation, and in the same time, to discharge the spent aqueous dispersion from an outlet provided at an upper end of another side of the space 7. Moreover, in this case, by circulating the aqueous inorganic acid solution in the anode chamber 5 and the aqueous alkaline solution in the cathode chamber 6, respectively, and in the same time by adjusting the amount of circulation in order to maintain the concentration of the acid and the alkali, respectively to constant, the cell 1 exemplified in FIG. 1 can be operated continuously, as will be understood from the above-mentioned explanation.

Figure 2:
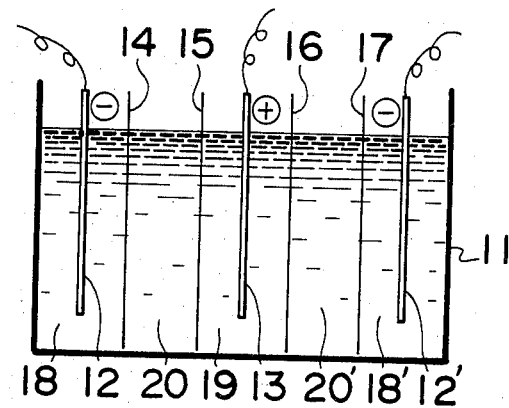
FIG. 2 is an explanatory FIGURE showing an instance of the multi-stage-wise combination of the apparatus shown in FIG. 1.

The apparatus exemplified in FIG. 2 has been designed for the simultaneous and parallel operation of electrodeposition of protein, in which two spaces are provided for introducing the aqueous dispersion of the protein. In FIG. 2, 11, 12 and 12', 13, 14, 15, 16, 17, 18 and 18', 19, and 20 and 20', respectively show, the cell, respective two cathodes, and anode provided at the center part of the cell 1, respectively the four ion-exchange membranes of the same kind, respectively two cathode chambers respectively formed by the ion-exchange membranes 14 and 17 as respective diaphragms, the anode chamber formed by the ion-exchange membranes 15 and 16, and respectively the spaces respectively formed by the ion-exchange membranes 14 and 15, and 16 and 17.

The operation of the cell exemplified in FIG. 2 may be performed in a manner as is shown in the cell exemplified in FIG. 1, and in the case where the pH of the aqueous dispersion of a protein introduced into the spaces 20 and 20' is adjusted so as to charge the protein negatively, the protein molecules move respectively toward the anodes in electrophoresis and arrive at the ion-exchange membranes 15 and 16. That is, in the cell exemplified in FIG. 2, the deposition of the protein is carried out in parallel, and accordingly, the amount of deposition per unit time is two times of the amount per unit time obtainable in the cell exemplified in FIG. 1, provided the other condition are the same.

Figure 3:
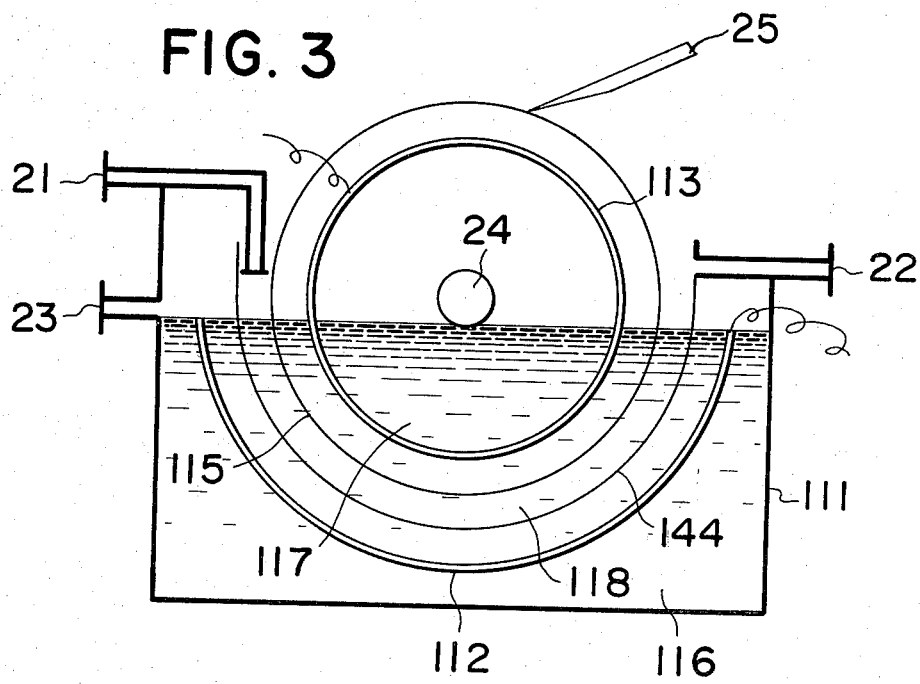
FIG. 3 is an explanatory figure showing one instance of the apparatus in which the method of electrodepositing according to the present invention is executed continuously.

The apparatus exemplified in FIG. 3 is one especially suitable for the continuous production of a film of protein, wherein the electrodes and the ion-exchange membranes are designed to be rotatory drum type. In FIG. 3, 111 is the cell designed to be able to hold the rotatory drum, 112 and 113 are the cathode of half drum type and the anode with a drum type structure, respectively. 144 and 115 are ion-exchange membranes of half drum type and the ion-exchange membrane with a drum type structure respectively. 116 is the cathode chamber formed by the inner wall of the cell 111 and the diaphragm of the ion-exchange membrane 144. 117 is the anode chamber formed by the ion-exchange membrane 115 as a diaphragm. And 118 is the space formed by two ion-exchange membranes 144 and 115, for holding the aqueous dispersion of the protein to be deposited, wherein at one end of the upper part, an inlet 21 and at another end of the upper part, an outlet 22 of the aqueous dispersion are provided. In FIG. 3, 23 shows a manifold provided with a supplying port of the aqueous electrolyte solution into the cathode chamber; and 24 shows a rotatory shaft; and 25 shows the scraper for the film of protein which has deposited onto the ion-exchange membrane 115. In addition, the above-mentioned rotatory shaft is made to be tubular and it is designed so that the aqueous electrolyte solution flows to and from the anode chamber 117 flows through the tubular shaft.

The operation of the cell 111 is carried out as follows:

The aqueous dispersion of a protein to be deposited is continuously introduced into the space 118 via the inlet 21 after having adjusted to make the charge of the protein molecules negative, and an aqueous alkaline solution is introduced into the cathode chamber 116 via the inlet in the manifold 23 and is discharged via the outlet in the same manifold 23 to have circulation. On the other hand, an aqueous inorganic acid solution is introduced into the anode chamber 117 through the rotatory shaft 24 and is discharged from the chamber via 24, to have circulation. The cylindrically-formed ion-exchange membrane 115 and the also cylindrically-formed anode 113 are rotated by a motor of a fixed r.p.m. connected to the rotatory shaft 24.

On applying a direct current under a fixed voltage to the apparatus 111, since the protein in the space 118 is charged negatively, it flows electrophoretically toward the anode 113 and is deposited onto the surface of the ion-exchange membrane 115 which has been placed in the anode-side to form a film of the protein. Accordingly, by scraping the protein film deposited on the membrane 115 with the scraper 25 provided on a suitable place approximating the membrane, the protein film is continuously producable. In addition, the spent aqueous dispersion was discharged from the outlet provided at the other end of the space 118.

Each apparatus above-exemplified is only shown as an example, and the apparatus for the execution of the present invention is not restricted by each of the above-mentioned ones, and moreover, it is to be understood that various modifications are possible for the purpose of the present invention. For instance, it is possible to install an apparatus in which the electrodes and the ion-exchange membranes are designed and constructed in the shape of endless belts, or an apparatus having the electrodes and the ion-exchange membranes designed and constructed in cylindrical shape.

The present invention is further explained referring to the following non-limiting Examples.

EXAMPLE 1

Sliced meat of tuna fish, weighing 20 g, was homogenized with 500 ml of water in a mixer and after adjusting the pH of the homogenate comprising mainly an aqueous dispersion of myo-protein to 3.5, it was filtered separately by (A) a gauge and (B) a sheet of filter paper, and the two kinds of transparent filtrate both mainly comprised an aqueous dispersion of myo-protein.

These two filtrates were named the aqueous dispersion of protein for electrodepositing (A) and (B), respectively, and they were respectively subjected to the electrodeposition in the space 7 of a small cell 1 illustrated in FIG. 1.

In the cathode chamber 6 of the cell 1, a cathode of effective area of 4 cm×9 cm, made of a stainless steel wire netting was inserted and an aqueous 0.2 N sodium hydroxide was placed therein. On the other hand, in the anode chamber 5, an anode of effective area of 4 cm×9 cm of DSA (titanium coated with ruthenium oxide) was inserted and an aqueous 0.1 N hydrochloric acid solution was placed therein. As cation-exchange membranes 4 and 4', Nafion (registered trade name of E. I. Du Pont de Nemours & Co. Inc.) #110 membrane of 10 mil in thickness and of 4 cm×9 cm in effective area was applied, the material of the membrane being a fluoropolymer resin having pendant-type sulfonate groups chemically introduced therein.

The distances between the ion-exchange membrane 4 and the cathode 3, between the two ion-exchange membranes, and between the ion-exchange membrane 4' and the anode 2 were, respectively, about 0.3 mm, about 15 mm and 0.3 mm. As the electric current, a direct current was supplied by a usual rectifier connected to a stabilized current source.

At first, a trial of electrodepositing was performed at a fixed voltage of 35 V. The fluctuation of the current was as shown in Table 1.

TABLE 1

| Dispersion (A) or (B) | Current (mA) | | |
|---|---|---|---|
| | Just after | After 2 minutes of the commencement of electrodepositing | After 5 minutes of the commencement of electrodepositing |
| (A) | ca. 500 | 460 | 360 |
| (B) | ca. 500 | 320 | 270 |

From after 5 minutes of the beginning of operation, the current become slowly reduced to an almost constant value of 150 to 170 mA. After operating for 10 minutes, the operation was stopped to determine the pH of the surface of the electrodeposited film. It was 4.7. The protein of tuna fish deposited on the cation-exchange membrane 4 attained about 200μ in thickness in the case (A) and was easily removable from the ion-exchange membrane. In the case (B), it was about 150μ in thickness and also easily removable from the membrane. In these films of tuna-protein, no bubbles are present, the protein having formed an extremely homogeneous film.

COMPARATIVE EXAMPLE 1

Using the same cell as in Example, however, not utilizing the ion-exchange membranes 4 and 4', and using a stainless plate of 4 cm×9 cm as the cathode and a DSA as the anode, the electrodepositing of the same protein as in Example was performed as follows:

After introducing the above-mentioned aqueous dispersion of tuna-protein (A) into the cell, a direct current of 35V was applied for 10 minutes from a stationary electric source. At that time, the current showed a remarkable reduction from 210 mA to about 10 mA. Although the cathodic stainless plate was plated with the tuna-protein, the thus obtained film of protein contained so many bubbles that the appearance of the film was lumpy.

COMPARATIVE EXAMPLE 2

Electrodeposition of the tuna protein of Example 1 was carried out in the same cell as in Example 1 while using Nafion #110 as the ion-exchange membrane 4' and Membrane-filter-Nuclipore (Registered Trade Name of General Electric Co. with a pore-diameter of 5) as the ion-exchange membrane 4 and after introducing the aqueous dispersion of tuna-protein (A) in Example 1 into the space 7, an aqueous 0.2 N sodium hydroxide solution into the cathode chamber 6 and an aqueous 0.1 N hydrochloric acid solution into the anode chamber 5 under a direct current of 35V. After 10 minutes of the operation, the pH of the surface of the deposited film of tuna-protein was as high as of pH of about 8, and the tuna-protein of the film was not dehydrated well and had a flabby feeling.

Accordingly, it was shown that the control of electrodepositing of protein is difficult when a porous membrane is used as a substitute for ion-exchange membrane. Moreover, the adhesion of the protein to the porous membrane was so strong that the complete removal of the film of tuna-protein from the porous membrane was extremely difficult.

EXAMPLE 2

Collagen protein obtained from oxhides was de-fatted well and after washing with water it was homogenized in water at a pH of 3.3 for 10 minutes to produce an aqueous homogeneous dispersion of collagen containing about 0.3% by weight of the protein. The thus obtained dispersion was introduced in the space 7 of the cell used in Example 1 and the electrodepositing was performed under the same conditions as in Example 1, however under a voltage of 20. The current was at first 150 mA, however, it showed a reduction as time passed by and came to be about 50 mA after 10 minutes of operation. The film of collagen on the ion-exchange membrane 4 was extremely homogeneous in quality and dehydrated favorably without containing (including) any bubbles. The film was easily removed from the membrane.

Comparative Example 3

The aqueous dispersion of collagen protein used in Example 2 was treated in the cell as in Example 1 without using, as in Comparative Example 2, ion-exchange membranes 4 and 4' and using a Ferro plate of 4 cm×9 cm as the cathode and a platinum plate as the anode. Although a current of 20 V was applied at first, since the current showed a rapid reduction from 120 mA to a few milliampere, the voltage was raised to 35 V. However, the current again showed a reduction to about 20 mA. The thus obtained collagen film has included a large amount of a gas evolved from the electrodes; being flabby it would not be subjected to the determination of its physical properties.

EXAMPLE 3

Using the aqueous dispersion of about 0.3% by weight of oxhide-collagen protein obtained in Example 2 as an electrical depositing liquid, and after introducing the liquid into the space 7 of the cell shown in FIG. 1, an operation of electrodepositing was performed, however, the ion-exchange membrane 4' in the anode side was not installed in the cell. After carrying out the deposition using only one ion-exchange membrane 4, the collagen deposited on the ion-exchange membrane as a homogeneous and well dehydrated film without including any bubbles almost in the same state as in Example 2. However, the pH of the spent aqueous dispersion became raised to about 4.2.

EXAMPLE 4

This example exemplifies the instance of continuously performing electrodepositing of protein.

The aqueous dispersion (A) of tuna-protein used in Example 1 of a pH of 3.5 was continuously introduced at a rate of about 280 ml/hour into the space 7 of the cell shown in FIG. 1 from a port on the upper surface of the space 7 while stirring the lower part of the space and was discharged from another port on the opposite part of the surface of the space 7. The electrodes and the construction of the cell was the same as in Example 1. An aqueous 0.2 N sodium hydroxide solution was circulated in excess in the cathode chamber 6 to maintain the concentration of the alkali in the aqueous solution in the chamber 6 always to 0.2 N. Also into the anode chamber 5, an aqueous 0.1 N hydrochloric acid solution was circulated in excess to maintain the concentration of hydrochloric acid in the chamber 5 always to 0.1 N. The ion-exchange membranes 4 and 4' were Nafion N-110 used in Example 1.

On applying a direct current at a stational voltage of 35 to the cell, the current was at first about 500 mA, however, after 2 minutes of operation when the protein gradually deposited on the ion-exchange membrane 4 the current was reduced to about 400 mA. At this point of time, the upper end part of the electrodeposited film of protein was detached from the membrane 4, and the detached part of the film was continuously pulled upwards to obtain a continued free film of protein at a rate that the current was maintained in the range of 230 to 300 mA. The continuously obtained film was washed in water of pH of 7.0

The thus obtained film of tuna-protein was of 120μ average thickness, when wet, without including any bubbles and was of extremely homogeneous quality.

EXAMPLE 5

An aqueous 2% by weight solution of ovo-albumin of an adjusted pH of 5.7 was used in a process of double electrodepositing in the cell shown in FIG. 2 while introducing the solution into the spaces 20 and 20', the kinds of the electrodes and the ion-exchange membranes used in this Example, and the distances between each ion-exchange membrane and each electrode, and those between each two ion-exchange membranes were all the same as in the cell used in Example 1. An aqueous 0.2 N sodium hydroxide solution was placed in the cathode chambers 18 and 18', and an aqueous physiological saline solution was placed in the anode chamber 19, both as electrolytic solutions. In operation, a direct current was applied at a stationary voltage of 35 between the cathode and the anode. During the operation, the current rose from 4 A to 6.5 A. The ovo-albumin deposited on the ion-exchange membranes 15 and 16 as two almost homogeneous films, and in each of them contamination by bubbles was not observed. There were apparently no differences between the thus obtained two films. After ending the operation, the pH values of the spent aqueous dispersions were 11.9 and 12.1, respectively, showing no remarkable difference.

EXAMPLE 6

A specimen of equine serum (Type #1, Pel-Freez Biologicals Inc.) with adjusted pH of 10.0 was placed in the space 7 of the cell used in Example 1, and in the cathode chamber 6 of the cell, an aqueous 0.2 N sodium hydroxide solution was placed, and in the anode chamber, an aqueous physiological solution was placed. After applying a direct current at a stationary voltage of 20 for 5 minutes, a film of equine serum was observed on the ion exchange membrane 4' installed in the anode side. The thus obtained film of protein was homogeneous in quality without including any bubbles. The pH of the spent aqueous liquid was 11.5.

EXAMPLE 7

The engine serum used in Example 6 was diluted with 5 times in volume of de-ionized water and after adjusting its pH to 7.5, it was continuously supplied into the cell shown in FIG. 3 from the inlet 21 to the chamber 118. In the cathode chamber, an aqueous 0.2 N sodium hydroxide solution was introduced from an inlet provided on the manifold 23 and circulated through an outlet also provided on the same manifold 23. In the anode chamber 117, an aqueous physiological saline solution was introduced from a tubular inlet provided on the rotatory axis 24 and circulated by discharging from a tubular outlet also provided on the axis 24. The drum-shaped anode 113 and the ion-exchange membrane 115 were rotated clockwise by the rotatory axis 24 at a rate of 90 cm/Hr.

The radius of the rotatory drum-type ion-exchange membrane 115 was 5 cm, and the effective area of the membrane was about 2 cm×15 cm, and the radius of curvature of the fixed semi-drum-type ion-exchange membrane 114 was 6.5 cm.

A direct current was applied under a stationary voltage of 20 while treating the aqueous liquid of 400 ml for one hour to form a gel film of equine serum-protein deposited on the rotary drum-type ion-exchange membrane 115. After scraping the thus formed thin film with the scraper 25, a homogeneous film of equine serum-protein was obtained. The current change from 2.2 A to 1.8 A during the operation and the pH of the spent aqueous liquid was 10.5 to 11.0.

What is claimed is:

1. A process for recovering protein from an aqueous solution or suspension containing the protein by electrically depositing the protein on at least one diaphragmatic membrane comprising introducing an aqueous solution of an electrolyte into at least one electrode-chamber formed by an electrode and an ion-exchange membrane as said diaphragmatic membrane, and electrophoretically moving said protein contained in said aqueous solution or suspension in a chamber adjacent to said electrode-chamber while controlling the pH of the surface of said ion-exchange membrane by creating a difference between the pH of said aqueous solution or electrolyte and the pH of said aqueous solution or suspension whereby said protein is recovered as a film or cylindrical film without bubbling.

2. The method according to claim 1, wherein said protein is at least one member selected from the group consisting of ovo-protein, lacto-protein, serum-protein, myo-protein, seed-protein, scleroprotein, chromoprotein, phosphoprotein, gycoprotein, nucleo-protein and lipoprotein.

3. The method according to claim 1, wherein the chamber in which said protein is electrophoretically moved is the electrode chamber formed by the anode and an ion-exchange membrane.

4. The method according to claim 1, wherein the chamber in which said protein is electrophoretically moved is the electrode chamber formed by the cathode and an ion-exchange membrane.

5. The method according to claim 1, wherein the chamber in which said protein is moved electrophoretically is the chamber formed between two ion-exchange membranes installed between electrodes.

6. The method according to claim 1, wherein the pH of said aqueous solution or suspension of said protein is in the range of from 2.0 to 10.0.

7. The method according to claim 1, wherein said aqueous solution of the electrolyte is an alkaline solution provided said protein is positively charged and said aqueous alkaline solution is supplied into said cathode chamber at an alkaline concentration of 0.1 to 5 N.

8. The method according to claim 7, wherein said aqueous alkaline solution is an aqueous solution of sodium hydroxide.

9. The method according to claim 1, wherein said aqueous solution of the electrolyte is an aqueous solution of an inorganic acid provided said protein is negatively charged and said aqueous solution of an inorganic acid is supplied into said anode chamber at a concentration of said inorganic acid of 0.1 to 5 N.

10. The method according to any one of claims 2 to 1, and wherein said ion-exchange membrane is constituted by a substance selected from the group consisting of fluoropolymers, intermolecular-bridged acrylic acid resin, intermolecular-bridged methacrylic acid resin, copolymers of sulfonated styrene and divinylbenzene and quarternized vinylpyridine resin provided with at least one substituent group selected from the group consisting of sulfonate group, carboxylate group and phenol group.

11. The method according to claim 1, wherein the supply of said aqueous solution of the electrolyte to said electrode chamber is performed circulately and the electrophoresis of said protein is continuously performed.

* * * * *